US008573032B2

(12) United States Patent
Denne et al.

(10) Patent No.: US 8,573,032 B2
(45) Date of Patent: Nov. 5, 2013

(54) UNDERWATER METHOD AND APPARATUS FOR DETECTING LEAKS IN A METALLIC TANK OR PIT LINER PLATE

(75) Inventors: Gregory Jacob Denne, Forest, VA (US); James Edwin McCann, Lynchburg, VA (US)

(73) Assignee: Areva NP Inc, Lynchburg, VA (US)

( * ) Notice: Subject to any disclaimer, the term of this patent is extended or adjusted under 35 U.S.C. 154(b) by 633 days.

(21) Appl. No.: 12/732,486

(22) Filed: Mar. 26, 2010

(65) Prior Publication Data

US 2010/0242576 A1    Sep. 30, 2010

Related U.S. Application Data

(60) Provisional application No. 61/211,443, filed on Mar. 30, 2009.

(51) Int. Cl.
*G01M 3/04* (2006.01)
(52) U.S. Cl.
USPC ............................................................. 73/40
(58) Field of Classification Search
USPC ....................................................... 73/38, 40
See application file for complete search history.

(56) References Cited

U.S. PATENT DOCUMENTS

| 3,184,957 | A | * | 5/1965 | Ellis et al. | 73/38 |
| 4,104,905 | A | * | 8/1978 | Zachary | 73/40 |
| 4,979,390 | A | * | 12/1990 | Schupack et al. | 73/38 |
| 5,734,096 | A | * | 3/1998 | McGuigan et al. | 73/49.2 |
| 8,091,440 | B2 | * | 1/2012 | Kim | 73/865.8 |
| 2006/0117837 | A1 | * | 6/2006 | Voglsinger | 73/40.7 |

* cited by examiner

*Primary Examiner* — Hezron E Williams
*Assistant Examiner* — Mark A Shabman
(74) *Attorney, Agent, or Firm* — Davidson, Davidson & Kappel, LLC

(57) ABSTRACT

A leak detecting apparatus for detecting flaws in a surface submerged in liquid is provided that includes a vacuum head for contacting the surface and forming a vacuum chamber filled with liquid between the surface and the vacuum head, the vacuum head including a multi-surface elastomer seal for contacting the surface; and a vacuum generator for pulling gas through a flaw in the surface into the vacuum head and to the gas separation chamber so as to displace the liquid from the gas separation chamber. A method for detecting flaws in a surface submerged in liquid is also provided.

12 Claims, 4 Drawing Sheets

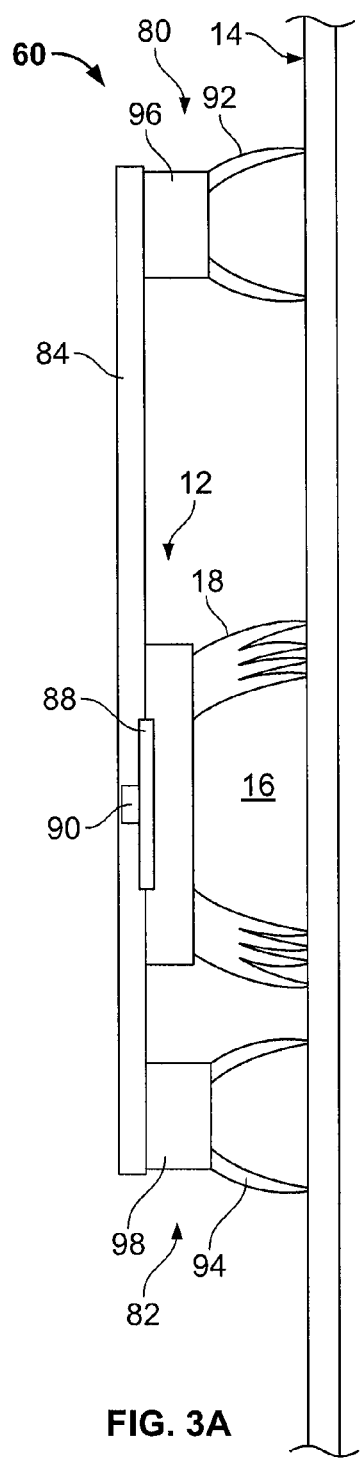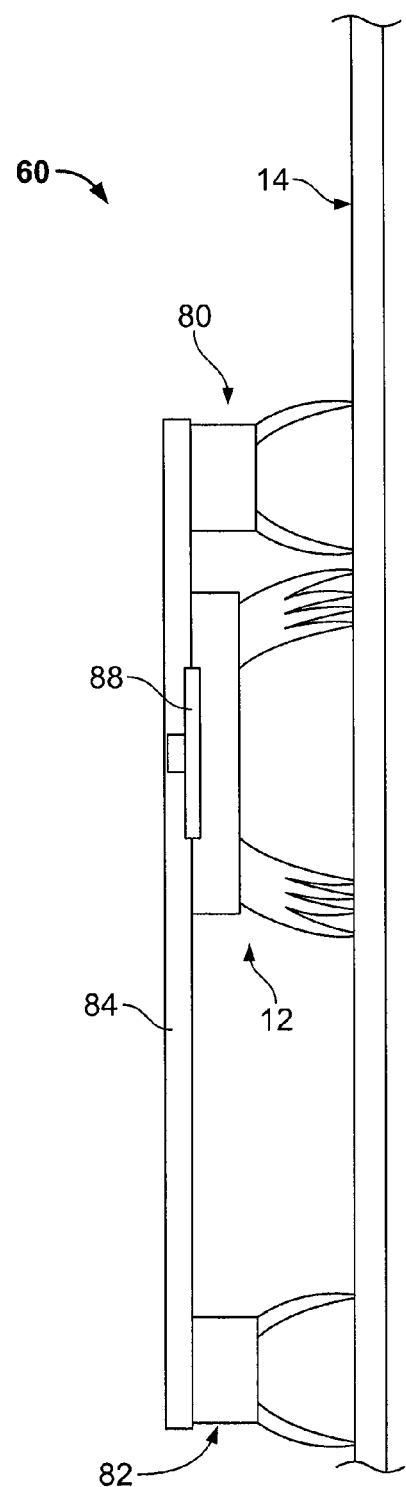
FIG. 3A
FIG. 3B

UNDERWATER METHOD AND APPARATUS FOR DETECTING LEAKS IN A METALLIC TANK OR PIT LINER PLATE

Priority to U.S. Provisional Patent Application Ser. No. 61/211,443 filed Mar. 30, 2009, is claimed, the entire disclosure of which is hereby incorporated by reference The present invention relates generally to leak detection and more specifically leak detection in a liquid-filled area of a tank, pit or pipe.

BACKGROUND OF INVENTION

Conventionally, in order to detect leaks in containers that hold liquids, such as tanks and metal-lined pits, liquid is first drained from the tank or metal-lined pit. After the liquid is drained out of the container, a bubble-forming solution is applied to a portion of the surface of the container that is to be inspected for flaws and a vacuum device is applied over the bubble-forming solution. The vacuum device includes a stiff, closed-cell foam seal for contacting the surface and forming a seal between the vacuum device and the surface. In order to form a vacuum chamber around the portion of the surface that is to be inspected, the worker has to manually push the vacuum device against the surface to be tested. If a leak is present in a liner material of the tank or metal-lined pit, air is drawn through the leak and a bubble forms in the vacuum chamber of the vacuum device. The vacuum device includes a viewing window that allows a worker to see if bubbles are forming in the vacuum chamber. Because of the stiff nature of the seal, the worker must force the vacuum device against the surface to compress the stiff, closed-cell foam seal and establish the vacuum. A force creating the vacuum may be generated by an air-driven Venturi. The vacuum may be initiated by opening an air flow valve that allows compressed air to flow through the Venturi. If a flaw is found, the worker marks the area with a suitable marking device, breaks the vacuum by closing the air flow valve and moves to the next area of the surface for leak detection.

BRIEF SUMMARY OF THE INVENTION

A leak detecting apparatus for detecting flaws in a surface submerged in liquid is provided that includes a vacuum head for contacting the surface and forming a vacuum chamber filled with liquid between the surface and the vacuum head, the vacuum head including a multi-surface elastomer seal for contacting the surface; and a vacuum generator for pulling gas through a flaw in the surface and into the liquid in the vacuum chamber.

A leak detecting apparatus for detecting flaws in a surface submerged in liquid is also provided that includes a vacuum head for contacting the surface and forming a vacuum chamber filled with liquid between the surface and the vacuum head; a gas separation chamber at least partially filled with liquid coupled to the vacuum head; and a vacuum generator for pulling gas through a flaw in the surface into the vacuum head and to the gas separation chamber so as to displace the liquid from the gas separation chamber.

A method for detecting flaws in a surface submerged in liquid is also provided that includes the steps of surrounding a portion of the surface with a vacuum head; providing a suction flow to form a vacuum chamber filled with liquid within the vacuum head; and determining whether the portion of the surface has a flaw based on whether air is sucked through the surface into the vacuum chamber.

BRIEF DESCRIPTION OF THE DRAWINGS

The present invention is described below by reference to the following drawings, in which:

FIGS. 3a to 3c schematically show how a propulsion device may move a vacuum head of leak detecting apparatus along a surface.

DETAILED DESCRIPTION

Figure 1:
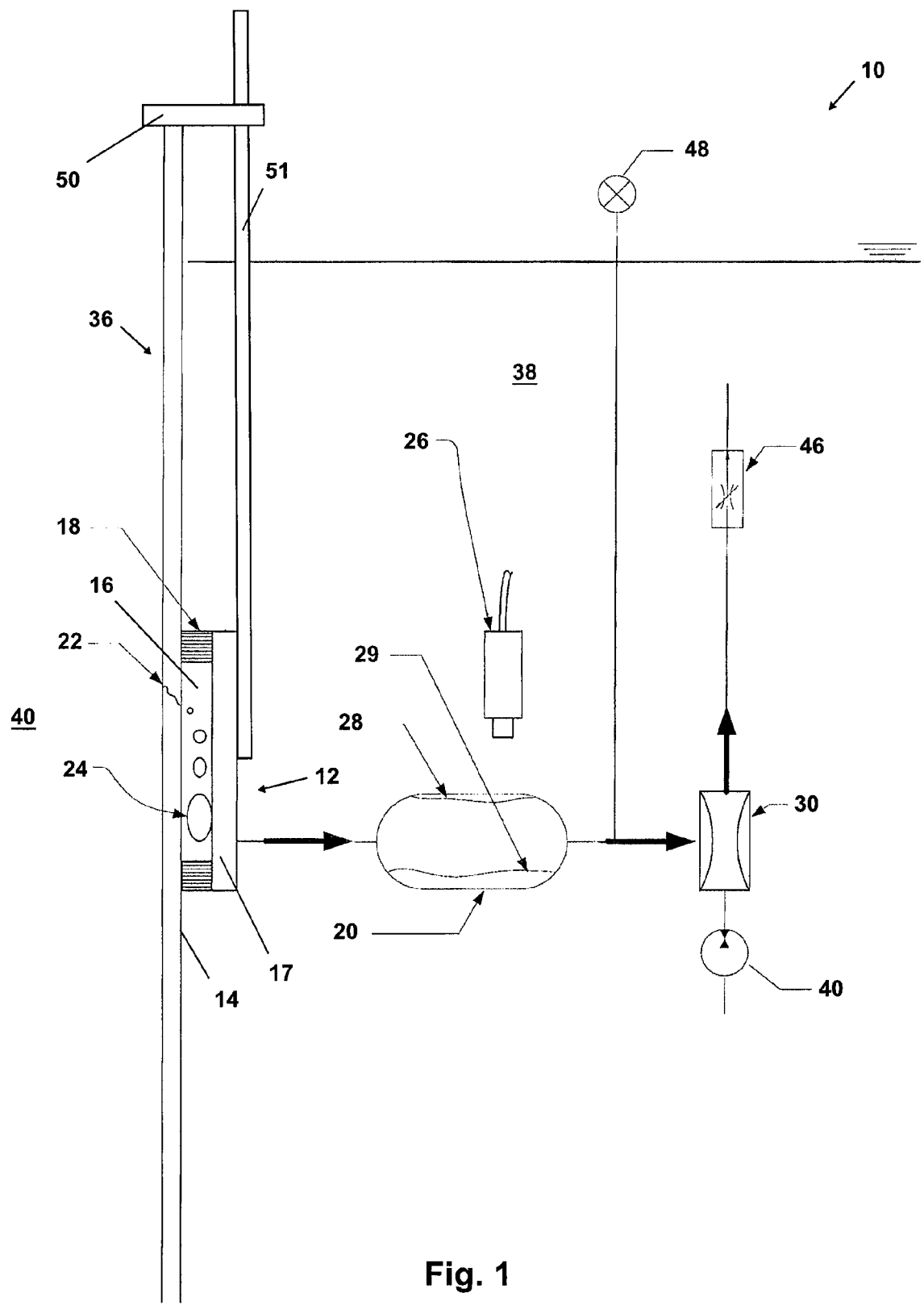
FIG. 1 schematically shows a leak detecting apparatus according to an embodiment of the present invention.

FIG. 1 schematically shows a leak detecting apparatus 10 according to an embodiment of the present invention. Leak detecting apparatus 10 allows leaks to be detected in a surface 14 of a container 36 holding a liquid 38 without first draining liquid 38 from container 36. In preferred embodiments, container 36 is a tank or a metal-lined pit formed by liner plates and liquid 38 is water. Leak detecting apparatus 10 includes a vacuum head 12 that may be submerged in liquid 38 and brought into contact with surface 14 to create a liquid-filled vacuum chamber 16 formed by vacuum head 12 and surface 14. Vacuum head 12 includes a frame 17 and a multi-surface elastomer seal 18 extending from frame 17 that delimits the sides of vacuum chamber 16. Frame 17 provides structural rigidity to vacuum head 12.

Multi-surface elastomer seal 18 has a compliant design that allows seal 18 to be easily pressed against surface 14 by an operator of leak detecting apparatus 10 to initiate a vacuum force in vacuum chamber 16. Multi-surface elastomer seal 18 includes multiple surfaces arranged between an inner circumference of elastomer seal 18 and an outer circumference of elastomer seal 18 for contacting surface 14. Each surface may extend entirely around vacuum chamber 16 so that each surface acts as an additional barrier between vacuum chamber 16 and liquid 38 to prevent liquid 38 from entering vacuum chamber 16 after multi-surface elastomer seal 18 is brought into contact with surface 14. In an underwater environment, it may be difficult to apply force to form a sealed vacuum with surface 14 without complicated thrusters or other force generating devices. The design of multi-surface elastomer seal 18 may advantageously require only a minimal force to initiate the sealed vacuum and form vacuum chamber 16 and may eliminate the need for complicated thrusters or other force generating devices. Multi-surface elastomer seal 18 may also be sufficiently compliant such that seal 18 is more tolerant of deviations or surface discontinuities (e.g., welds between liner plates) in surface 14. In this preferred embodiment, frame 17 is substantially flat and seal 18 has a low profile so that vacuum head 12 has a small overall profile. Vacuum head 12 may then advantageously be used in confined areas that may previously have been difficult to access.

Leak detecting apparatus 10 includes a gas separation chamber 20 coupled to vacuum head 12. When vacuum head 12 encounters a flaw or leak 22 in surface 14, air 40 from outside of container 36 is drawn through flaw 22 into vacuum chamber 16 as air bubbles 24. As the air enters vacuum chamber 16, due to a significant decrease in pressure, the air greatly expands. The expanding air is provided via suction flow to gas separation chamber 20, displacing liquid in gas separation chamber 20. A change in the amount of liquid in gas separation chamber 20 may be easily observed directly by a worker or through surveillance equipment, such as a remote video camera 26. In alternative embodiments, the contents of gas separation chamber 20 may be detected by a sensor coupled to chamber 20. For example, liquid may fill gas separation chamber 20 to a high level 28 when a flaw is not present in an area of surface 14 enclosed by vacuum head 12 and liquid may only fill gas separation chamber to a lower level 29 when a flaw is present in an area of the surface 14 enclosed by vacuum head 12. In a preferred embodiment, gas separation chamber 20 is configured so that the operator of leak detecting apparatus 10 can visually detect a leak in container 36 simply by viewing an increase of air in gas separation chamber 20. For example, at least a portion of gas separation chamber 20 may be transparent to allow observation of the contents of gas separation chamber 20.

The vacuum in leak detecting apparatus 10 may be established by a vacuum generator 30 and a pump 40, using liquid 38 as the working fluid for creating the vacuum. In a preferred embodiment, vacuum generator 30 is a Venturi-style generator. Pump 40 supplies a primary flow of liquid 38 to vacuum generator 30. A flow control valve 46 may be included to control the primary liquid flow and a vacuum gauge 48 may be included to measure the suction flow between gas separation chamber 20 and vacuum generator 30.

Leak detecting apparatus 10 may also include an indexing system for indexing a location of vacuum head 12 and a propulsion device 60 (FIGS. 3a to 3c) for moving vacuum head 12 along surface 14 during inspection. The indexing system may include a track 50 mounted above liquid 38 for indicating a position of vacuum head 12 along surface 14. Vacuum head 12 may be slidingly coupled to track 50 via a connector 51. Connector 51 may be coupled to track 50 by a wheel manipulator. In one embodiment, one or more workers may observe and document the vertical and horizontal positions of connector 51 with respect to track 50 to determine the vertical and horizontal position of vacuum head 12 when the liquid level in gas separation chamber 20 changes to index the location of flaws detected in container 36. Using the indexing system may allow flaws to be more easily located and may optimize a subsequent process for repairing the flaws. Detecting a specific location for each flaw may allow smaller areas of surface 12 of container 36 to be repaired.

Figure 2:
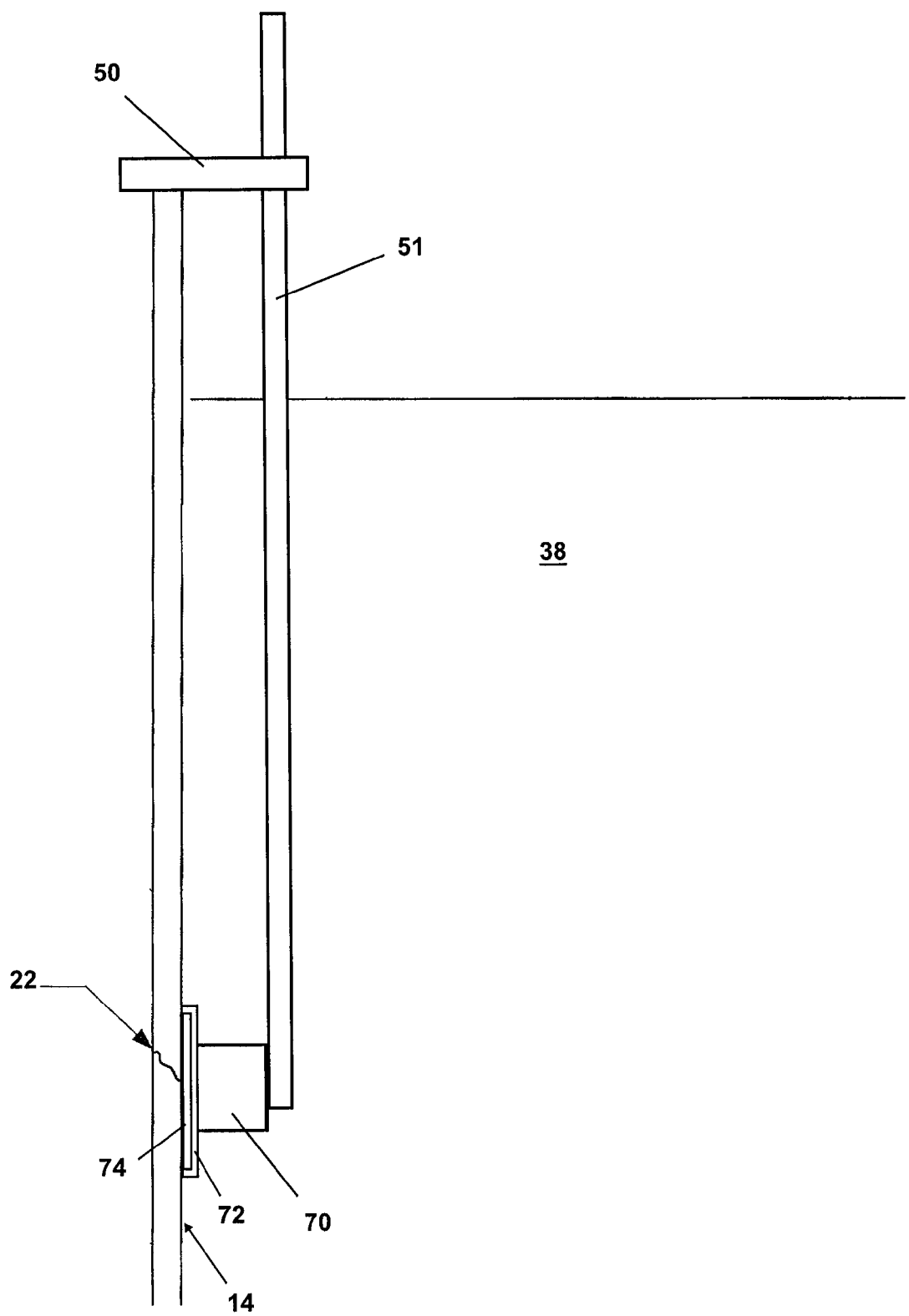
FIG. 2 schematically shows a repair device for repairing flaws detected by the leak detecting apparatus.

FIG. 2 shows a repair device 70 for repairing flaws detected by leak detecting apparatus 10. After the inspection process is complete, vacuum head 12 may be removed from connector 51 and replaced with repair device 70 so that repair device 70 is slidingly coupled to track 50 via connector 51. Repair device 70 may place a thin repair plate 72 over flaw 22. Repair plate 72 may be covered with an adhesive mixture 74 on the side of repair plate 72 that contacts surface 14. Adhesive mixture 74 may seal flaw 22 with repair plate 72 providing sufficient rigidity to hold adhesive mixture 74 in place. Edges of repair plate 72 are bent around adhesive mixture 74 to help prevent adhesive mixture 74 from being washed away. Repair device 70 may include grippers for holding repair plate 72 during application and an actuator for forcing repair plate 72 against surface 14. Repair device 70 may also include a propulsion device, which may include a plurality of suction heads and operate in a manner similar to propulsion device 60 (FIGS. 3a to 3c), for moving repair device 70 along surface 14.

Figure 3C:
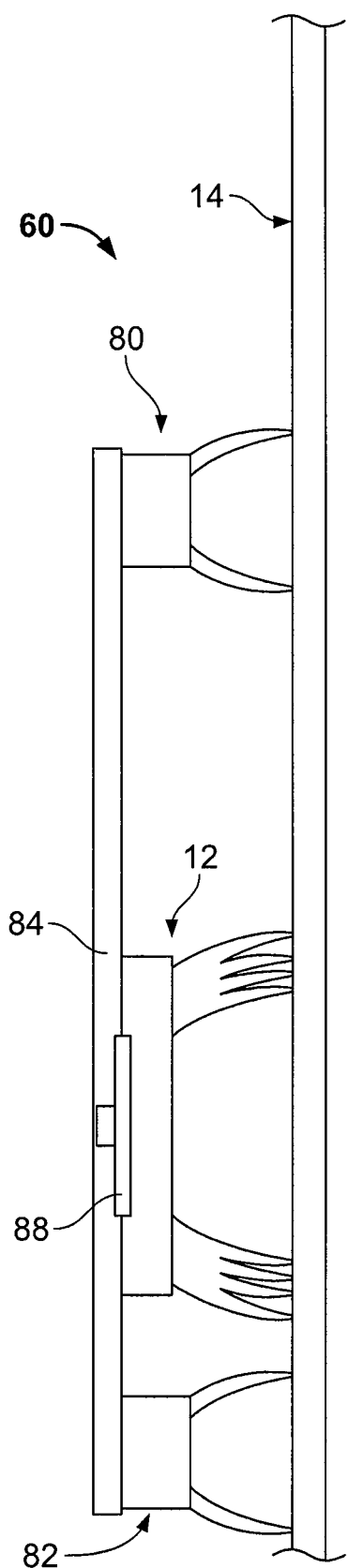

FIGS. 3a to 3c schematically show vacuum head 12 coupled to propulsion device 60. Propulsion device 60 includes two suction heads 80, 82 coupled to a base 84. Suction heads 80, 82 include respective elastomer seals 92, 94 and frames 96, 98 and may be selectively coupled to vacuum generator 30 (FIG. 1). Alternatively, suctions heads 80, 82 may be selectively coupled to an additional vacuum generator or each suction head 80, 82 may be selectively coupled to a respective individual vacuum generator. In this embodiment elastomer seals 92, 94 each only include a respective single sealing surface, although in other embodiments, elastomer seals 92, 94 may include two or more surfaces. As shown in FIGS. 3a to 3c, multi-surface elastomer seal 18 includes four surfaces for contacting surface 14 to define vacuum chamber 16. Each of the four surfaces completely surrounds vacuum chamber 16 to ensure that vacuum chamber 16 remains sealed from the surrounding liquid when the vacuum force is generator by vacuum generator 30 (FIG. 1). In other embodiments, vacuum chamber 16 may include more or less than four surfaces.

FIGS. 3a to 3c illustrate how propulsion device 60 may move vacuum head 12 along surface 14 while surface 14 is submerged in liquid. In FIG. 3a, a vacuum force is being generated by vacuum generator 30 (FIG. 1) such that vacuum chamber 16 is formed by vacuum head 12 and surface 14. A linear actuator 88 connecting base 84 and vacuum head 12 then moves base 84 downward to the position shown in FIG. 3b while vacuum head 12 is held against surface 14 by the vacuum force generated by vacuum generator 30 (FIG. 1). Once propulsion device 60 is positioned as shown in FIG. 3b, a vacuum force is coupled to suction heads 80, 82 so that vacuum chambers are formed between suctions heads 80, 82 and surface 14 and suction heads 80, 82 are held against surface 14. Then, the vacuum force provided to vacuum head 12 is ceased and vacuum head 12 is moved by linear actuator 88 downward to the position shown in FIG. 3c. The vacuum force may then again be provided to vacuum head 12 so that flaws may detected in the portion of surface 14 that is surrounded by vacuum head 12. Propulsion device 60 may also include a rotational actuator 90 for rotating vacuum head 12 and base 84 with respect to one another. Rotational actuator 90 allows propulsion device 60 to move vacuum head 12 in any direction along surface 12.

The propulsion device may enable accurate positioning of vacuum head 12 with little effort by the operator. A reaction device may also optionally be provided as a contingency provision to aid in establishing the initial vacuum by pushing vacuum head 12 against surface 14. However, due to the compliant design of multi-surface elastomer seal 18 a reaction device may not be required.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for detecting flaws in a surface submerged in liquid:
    submerging a vacuum head in the liquid and surrounding a portion of the surface with the vacuum head;
    providing a suction flow to form a vacuum chamber filled with liquid within the vacuum head;
    determining that the portion of the surface has a flaw if air is sucked through the surface into the liquid in the vacuum chamber; and
    moving the vacuum head to a different location of the surface with a propulsion device,
    wherein the propulsion device is removably connectable to the surface and the moving step includes:
    moving the propulsion device with respect to the vacuum head; and
    moving the vacuum head with respect to the propulsion device.

2. The method recited in claim 1 wherein the determining step includes monitoring a liquid level in a gas separation chamber coupled to the vacuum head.

3. The method recited in claim 2 wherein the determining step includes determining that the portion of the surface has a flaw if the air sucked through the surface into the liquid in the vacuum chamber causes the liquid level in the gas separation chamber to drop below a predetermined level.

4. The method recited in claim 3 wherein the air sucked through the surface into the liquid in the vacuum chamber expands due to a decrease in pressure.

5. The method recited in claim 1 further comprising, if a flaw is detected, indexing a location of the flaw using an indexing system.

6. The method recited in claim 5 wherein the indexing system includes a track mounted above the liquid the surface is submerged in and coupled to the vacuum head and the indexing involves determining the position of the vacuum head with respect to the track.

7. The method recited in claim 6 further comprising coupling a repair device to the track and repairing the flaw with the repair device.

8. The method recited in claim 7 wherein the repairing the flaw with the repair device includes placing a repair plate over the flaw.

9. The method recited in claim 7 wherein the repairing the flaw with the repair device includes covering the repair plate with an adhesive and contacting the surface with the repair plate to seal the flaw.

10. The method recited in claim 1 wherein the propulsion device is removably connected to the surface when the vacuum head is moved with respect to the propulsion device and the vacuum head is removably connected to the surface when the propulsion device is moved with respect to the vacuum head.

11. The method recited in claim 10 wherein the propulsion device includes at least one suction head that removably connects to the surface via a vacuum.

12. A method for detecting flaws in a surface submerged in liquid:
    submerging a vacuum head in the liquid and surrounding a portion of the surface with the vacuum head;
    providing a suction flow to form a vacuum chamber filled with liquid within the vacuum head;
    determining that the portion of the surface has a flaw if air is sucked through the surface into the liquid in the vacuum chamber; and
    moving the vacuum head to a different location of the surface with a propulsion device, wherein the propulsion device includes two suction heads and the moving step includes:
    moving the two suction heads with respect to the vacuum head;
    creating a vacuum between each of the two suction heads and the surface; and
    moving the vacuum head with respect to the two suction heads.

* * * * *